C. C. Lloyd,

Gas Meter

No. 1,153. Reissued Mar. 19, 1861.

Witnesses.
J. C. Colton
Benj. Morrow

Inventor.
Chas. C. Lloyd

N. PETERS, PHOTO-LITHOGRAPHER, WASHINGTON, D. C.

UNITED STATES PATENT OFFICE.

CHARLES C. LLOYD, OF PHILADELPHIA, PENNSYLVANIA.

IMPROVEMENT IN GAS-METERS.

Specification forming part of Letters Patent No. 11,128, dated June 20, 1854; Reissue No. 1,153, dated March 19, 1861.

*To all whom it may concern:*

Be it known that I, CHARLES C. LLOYD, of Philadelphia, Pennsylvania, have invented certain Improvements in Gas-Meters; and I do hereby declare the following to be a full, clear, and exact description of the same, reference being had to the accompanying drawings, and to the letters of reference marked thereon.

The nature of my invention consists, first, in the employment, within the meter, of a float so operating and so connected with other appliances, described hereinafter, as to effect the double purpose of regulating or equalizing the pressure of gas within the meter, and also of obstructing the flow of gas into the meter when the water becomes too low; secondly, in causing a float (combined with any suitable inlet-valve) to operate in a chamber so placed within the front of the meter as to be isolated from the inlet-pressure, the said chamber being so situated or so constructed that its interior may communicate with the inlet-pressure at a point between the water-line and the top of the central opening of the drum when the water gets too low, as fully described hereinafter, so that there may be no interruption of the free entrance of gas into the meter as the water gradually decreases and until the water becomes so low that there is danger of the gas passing into the central opening.

In order to enable others skilled in the art to make and use my invention, I will now proceed to describe its construction and operation.

Figure 1:
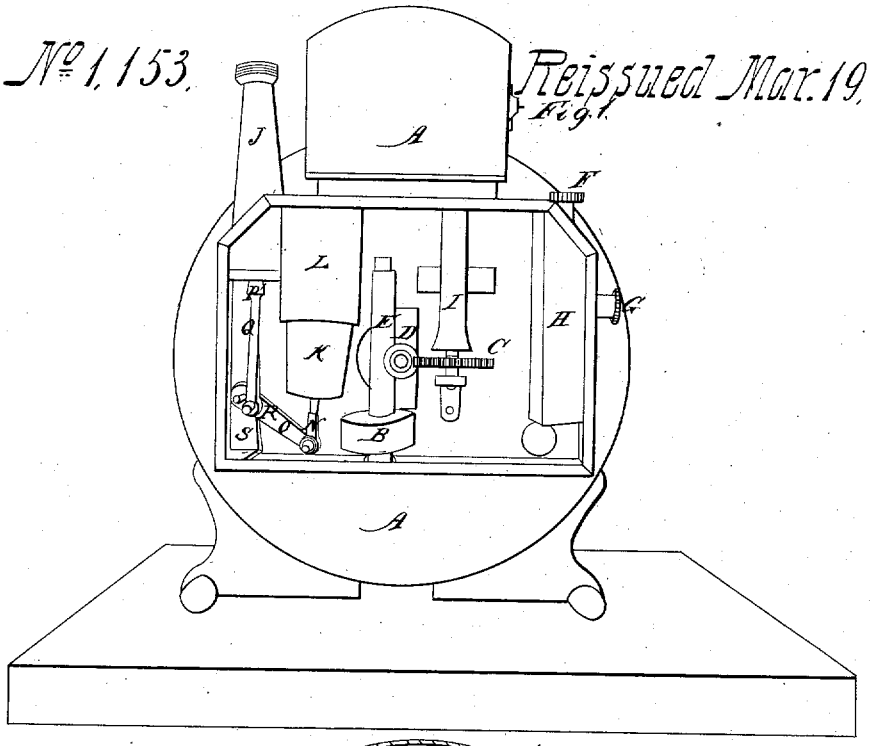
Figure 2:
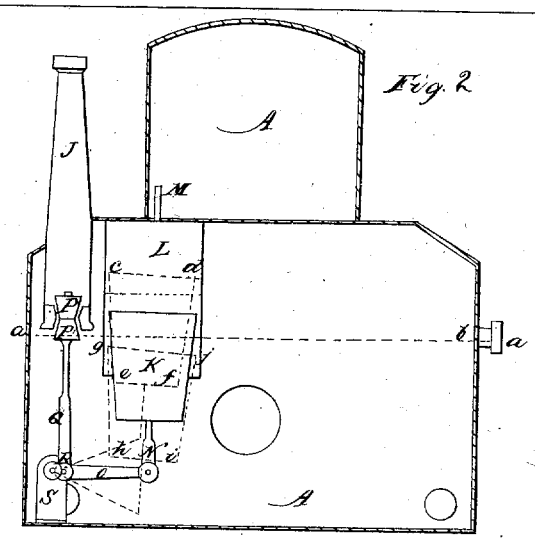

On reference to the accompanying drawings, which form a part of this specification, Figure 1 is a perspective view of a gas-meter with the front plate removed in order to illustrate my improvements, and Fig. 2 is a vertical section showing more particularly the construction and operation of my improvements.

Similar letters refer to similar parts in the two views.

A represents the outer casing of the meter; B, what is known as the "dry-well;" D, the worm secured to the spindle of the drum, (the latter not being shown in the drawings,) the saip worm gearing into a worm-wheel, C, on a spindle, which operates the dial-works; E, the inlet-pipe, communicating with the dry-well, and, by means of a bent tube (not shown in the drawings,) with the drum.

X is the central opening to the drum; F, the tube through which water is introduced to the interior of the casing, and G the outlet for the water for the purpose of adjusting the water-line *a b*, Fig. 2.

H is a chamber for preventing the escape of the gas through the tubes F and G; I, the pipe for preventing the escape of the gas into the dial-chamber, and J the supply-pipe through which the gas is introduced into the meter.

The parts above described are common to ordinary wet-meters, and are too well understood by those familiar with these instruments to need further description.

In the interior of the front portion of the meter I secure a cylindrical or other suitably-formed chamber, *i*, the lower end of which projects a short distance below the water-line *a b*, Fig. 2, and terminates at a point above the top of the central opening, X. The interior of this chamber in the present instance communicates through a pipe, M, with the dial-chamber, it being indispensable that the interior of this chamber L, no matter with what part of the meter it may be made to communicate, or how it may be constructed, should be isolated from the inlet-pressure in the front portion of the meter at all times excepting under the circumstances alluded to hereinafter. Within this chamber a float, K, is arranged to move freely, the lower end of the float having a rod, N, which is jointed to the outer end of the lever O, the fulcrum of the latter being on a stationary plate, S. Within the lower end of the supply-pipe J is a double valve, P P′, of any suitable form, and this valve is secured to or forms a part of the upper end of a rod, Q, the lower end of which is jointed to the lever O. These valves are so adapted to their seats, are so arranged, and are so connected to the lever O and to the float as to diminish the flow of gas into the meter when the pressure is increased, and to entirely obstruct the entrance of gas into the meter when the water in the latter becomes too low. Supposing, for instance, that the dotted line *a b*, Fig. 2, represents the proper water-line, and that the float is in the position it would be before the gas is allowed to enter the meter, and that the valves N N′ are both removed to about the same distance from their respective seats. On the gas being introduced into the meter, its pressure will be communicated to the surface of the water, which will of course rise in the isolated chamber L, carrying with it the float K, thereby raising the lever O and moving the lower valve, P′, near to its seat, the size of the inlet-opening being thus reduced, and this reduction of the opening being continued as the pressure of the gas increases. As the water gradually diminishes, the float K will continue to retain its position, thus allowing for a continued free flow of gas into the meter; but when the water gets so low that the gas can escape into the chamber L the isolation of the latter is neutralized, and the float consequently drops with a sudden movement, thereby cutting off all further entrance of gas into the meter. While the gas continues to flow through the meter the lower valve, P′, can never close entirely to its seat, although its range of motion is very short; but it is obvious that as the pressure of gas is increased, so will the orifice of the valve be diminished, and this is a very necessary and important effect in practice, inasmuch as the gas passing through the drum is at all times maintained at about the same density. A regulator or governor has been applied to the supply-pipe on the outside of and detached from the meter for equalizing the pressure of gas within the same, while an ordinary float connected with the inlet-valve in the supply-pipe and in the inside of the meter is always applied for stopping off the flow of gas into the meter when the water becomes too low. It will be evident that my improvement affords a simple, compact, and economical device for accomplishing the same end as these two instruments. By causing the float to operate in a chamber isolated from the inlet-pressure, and by constructing and arranging the chamber in respect to the water-line and the top of the central opening as described above, a great advantage over the ordinary float arrangement is obtained. By the use of the latter the flow of gas is gradually interrupted as the water gradually decreases, whereas by the use of my improvement the flow of gas remains uninterrupted until the water gets so low that there is danger of the gas passing into the central opening, X, the float instantly dropping before this can take place, and the further entrance of gas to the meter thereby obstructed.

I do not claim, broadly, the combination of a float with a valve so arranged as to regulate the flow of gas into the meter; but

I claim as my invention and desire to secure by Letters Patent—

1. The application of the principle and mode of operation herein described, when the double purpose is effected of equalizing and regulating the pressure of gas within the meter, and of shutting off the gas when the water gets too low, by combining the valve with one and the same float, all within the meter, substantially as and for the purposes herein set forth.

2. The float K, in combination with any suitable inlet-valve, when the said float operates in a chamber, L, so placed in the front of the meter as to be isolated from the inlet-pressure, and the said chamber being so situated or so constructed that its interior may communicate with the inlet-pressure at a point between the water-line and the top of the center opening of the drum when the water gets too low, as set forth, for the purpose specified.

In testimony whereof I have signed my name to this specification before two subscribing witnesses.

CHAS. C. LLOYD.

Witnesses:
HENRY HOWSON,
JOHN WHITE.